(12) United States Patent  
Lin (10) Patent No.: US 11,575,441 B2
(45) Date of Patent: Feb. 7, 2023

(54) OPTICAL PROCESSING MODULE AND OPTICAL PROCESSING APPARATUS

(71) Applicant: HUAWEI TECHNOLOGIES CO., LTD., Guangdong (CN)

(72) Inventor: Liankui Lin, Dongguan (CN)

(73) Assignee: HUAWEI TECHNOLOGIES, CO., LTD., Shenzhen (CN)

( * ) Notice: Subject to any disclaimer, the term of this patent is extended or adjusted under 35 U.S.C. 154(b) by 0 days.

(21) Appl. No.: 17/371,168

(22) Filed: Jul. 9, 2021

(65) Prior Publication Data

US 2021/0336699 A1 Oct. 28, 2021

Related U.S. Application Data

(63) Continuation of application No. PCT/CN2019/071279, filed on Jan. 11, 2019.

(51) Int. Cl.
*H04B 10/27* (2013.01)

(52) U.S. Cl.
CPC .................................... *H04B 10/27* (2013.01)

(58) Field of Classification Search
CPC .. H04B 10/27; H04B 10/25; H04B 10/07955; H04J 14/08
See application file for complete search history.

(56) References Cited

U.S. PATENT DOCUMENTS

| 2007/0189771 A1* | 8/2007 | Kim ..................... H04J 3/1694 398/69 |
| 2010/0232794 A1 | 9/2010 | Zheng |
| 2013/0045010 A1* | 2/2013 | Mukai .................. H04J 3/0688 398/52 |
| 2014/0186039 A1* | 7/2014 | Luo ..................... H04L 12/2861 398/66 |

(Continued)

FOREIGN PATENT DOCUMENTS

| CN | 101001117 A | 7/2007 |
| CN | 101188460 A | 5/2008 |

(Continued)

OTHER PUBLICATIONS

Office Action issued in CN201980055637.1, dated Feb. 18, 2022, 6 pages.

(Continued)

*Primary Examiner* — Dzung D Tran (57) ABSTRACT

This application provides an optical processing module and an optical processing apparatus. The optical processing apparatus includes at least two optical processing modules. The optical processing module includes a processing unit, and further includes at least one first interface, at least one second interface, and at least one third interface. Each of at least one first interface is configured to connect to and communicate with an upper-layer device, each of the at least one second interface is configured to connect to and communicate with a user-side device, each of the at least one (Continued)

third interface is configured to connect to and communicate with a third interface of another optical processing module, and the processing unit is configured to process, according to a first control instruction, data received from the at least one first interface and the at least one third interface.

17 Claims, 4 Drawing Sheets

(56) References Cited

U.S. PATENT DOCUMENTS

| | | | |
|---|---|---|---|
| 2015/0280851 A1 | 10/2015 | Sarashina | |
| 2017/0078021 A1 | 3/2017 | Zhang et al. | |
| 2018/0076890 A1* | 3/2018 | Ruchet | H04J 14/02 |
| 2019/0215071 A1* | 7/2019 | Shulman | H04L 12/2856 |

FOREIGN PATENT DOCUMENTS

| | | |
|---|---|---|
| CN | 101771902 A | 7/2010 |
| CN | 102064885 A | 5/2011 |
| CN | 102480323 A | 5/2012 |
| CN | 104244116 A | 12/2014 |
| EP | 2713628 A2 | 4/2014 |
| JP | 2011071951 A | 4/2011 |
| JP | 2014523182 A | 9/2014 |
| JP | 2015115627 A | 6/2015 |
| JP | 2016149665 A | 8/2016 |
| JP | 2017536056 A | 11/2017 |
| JP | 2019047174 A | 3/2019 |
| JP | 2019068198 A | 4/2019 |
| WO | 2005099298 A1 | 10/2005 |
| WO | 2012042674 A1 | 4/2012 |

OTHER PUBLICATIONS

International Search Report and Written Opinion issued in PCT/CN2019/071279, dated Sep. 29, 2019, 8 pages.
Changkui Zhu et al.,"Design and Realization of GPON access network", Jun. 7, 2014, total: 66 pages.
Fahmida Rawshan et al.,"Architecture and Dynamic Bandwidth Allocation of Multi-OLT PON Systems", IEEE Xplore: Nov. 18, 2011, ICTC 2011, total: 2 pages.
Office Action issued in JP2021-540190, dated Aug. 30, 2022, 8 pages.
Notice of Allowance issued in JP2021-540190, dated Nov. 15, 2022, 4 pages.

* cited by examiner

OPTICAL PROCESSING MODULE AND OPTICAL PROCESSING APPARATUS

CROSS-REFERENCE TO RELATED APPLICATIONS

This application is a continuation of International Application No. PCT/CN2019/071279, filed on Jan. 11, 2019, which is hereby incorporated by reference in its entirety.

TECHNICAL FIELD

This application relates to optical network technologies, and in particular, to an optical processing module and an optical processing apparatus.

BACKGROUND

With development of a passive optical network (PON) technology, fiber to the home (FTTH) or fiber to the curb (FITC) has become a mainstream technology for high-bandwidth home access worldwide. A PON architecture includes an optical line termination OLT, an optical distribution network (ODN), and an optical network unit (ONU). One OLT may be connected to a plurality of ONUs through the ODN, and each ONU may be connected to a plurality of terminal devices.

The OLT is a core component of a PON. The OLT is connected to a network-side device (for example, a switch or a router) at an upper layer, and is connected to one or more ODNs at a lower layer. One OLT may provide a plurality of PON interfaces. A conventional OLT (including a centralized OLT and a distributed OLT) uses a plug-in frame structure and usually includes a line card and a main control board/network board used for centralized forwarding or centralized switching. However, the OLT solution is complex and costly. Another kind of OLT uses a system on chip (SOC) with a small capacity. The kind of SOC usually implemented by one chip, but has a small quantity of ports and small traffic.

It is clear that the existing OLTs cannot meet user requirements, and a new type of OLT is urgently needed.

SUMMARY

This application provides an optical processing module and an optical processing apparatus, to simplify optical processing apparatuses and reduce costs.

According to an embodiment of a first aspect of this application, an optical processing module is provided, including a processing unit.

The optical processing module includes at least one first interface, at least one second interface, and at least one third interface.

Each of the at least one first interface is used to connect to and communicate with an upper-layer device, each of the at least one second interface is used to connect to and communicate with a user-side device, and each of the at least one third interface is used to connect to and communicate with a third interface of another optical processing module.

The processing unit is configured to process, according to a first control instruction, data received from the at least one first interface and the at least one third interface. The first control instruction indicates an actual data bandwidth allocated to the at least one first interface and an actual data bandwidth allocated to the at least one third interface in a downlink direction, and a sum of the actual data bandwidth allocated to the at least one first interface and the actual data bandwidth allocated to the at least one third interface is not greater than a processing capability of the optical processing module.

In an example implementation, that the processing unit is configured to process, according to a first control instruction, data received from the at least one first interface and the at least one third interface includes:

the processing unit is configured to perform at least data parsing, encapsulation, and scheduling on a part or all of the data received from the at least one first interface and the at least one third interface, and send processed data to the user-side device through the at least one second interface.

In another example implementation, that the processing unit is configured to process, according to a first control instruction, data received from the at least one first interface and the at least one third interface includes:

the processing unit is configured to send a part or all of the data received from the at least one first interface and the at least one third interface to another optical processing module through another third interface different from the interface used to receive the data.

In an example implementation, the first at least one interface and the at least one third interface are Ethernet interfaces, and the at least one second interface is a passive optical network (PON) interface.

In an example implementation, the processing unit is further configured to process, according to a second control instruction, data received from the at least one second interface and the at least one third interface. The second control instruction indicates an actual data bandwidth allocated to the at least one second interface and the actual data bandwidth allocated to the at least one third interface in an uplink direction, and a sum of the actual data bandwidth allocated to the at least one second interface and the actual data bandwidth allocated to the at least one third interface is not greater than the processing capability of the optical processing module.

In an example implementation, that the processing unit is further configured to process, according to a second control instruction, data received from the at least one second interface and the at least one third interface includes:

the processing unit is configured to perform at least data parsing, encapsulation, and scheduling on a part or all of the data received from the at least one second interface and the at least one third interface, and send processed data to the upper-layer device through the at least one first interface.

In another example implementation, that the processing unit is further configured to process, according to a second control instruction, data received from the at least one second interface and the at least one third interface includes:

the processing unit is configured to send a part or all of the data received from the at least one second interface and the at least one third interface to another optical processing module through another third interface different from the interface used to receive the data.

According to an embodiment of a second aspect of this application, an optical processing apparatus is provided, including a plurality of optical processing modules according to any one of the examples above. At least two optical modules in the plurality of optical processing modules are connected through their respective third interfaces.

The optical processing apparatus further includes at least one bandwidth scheduling unit, configured to allocate actual data bandwidths to first interfaces and third interfaces in the plurality of optical processing modules.

In an example implementation, when two optical processing modules are disconnected, the two optical processing modules cannot communicate with each other.

In an example implementation, each optical processing module includes two first interfaces, and the two first interfaces are active/standby interfaces.

A non-limiting example of this application provides an optical processing module and an optical processing apparatus. The optical processing apparatus includes at least two optical processing modules. Each of the optical processing modules includes a processing unit, and further includes at least one first interface, at least one second interface, and at least one third interface. Each of the at least one first interface is used to connect to and communicate with an upper-layer device, each of the at least one second interface is used to connect to and communicate with a user-side device, each of the at least one third interface is used to connect to and communicate with a third interface of another optical processing module, and the processing unit is configured to process, according to a first control instruction, data received from the at least one first interface and the at least one third interface. The first control instruction indicates an actual data bandwidth allocated to the at least one first interface and an actual data bandwidth allocated to the at least one third interface in a downlink direction. A plurality of optical processing modules are interconnected to form a high-density box-shaped device or a medium-density box-shaped device. This solution is simple and cost-effective.

DESCRIPTION OF EMBODIMENTS

Current broadband access technologies are mainly categorized into copper access technologies (for example, various DSL technologies) and an optical access technology. An access network implemented by using the optical access technology is referred to as an optical access network (OAN).

Figure 1:
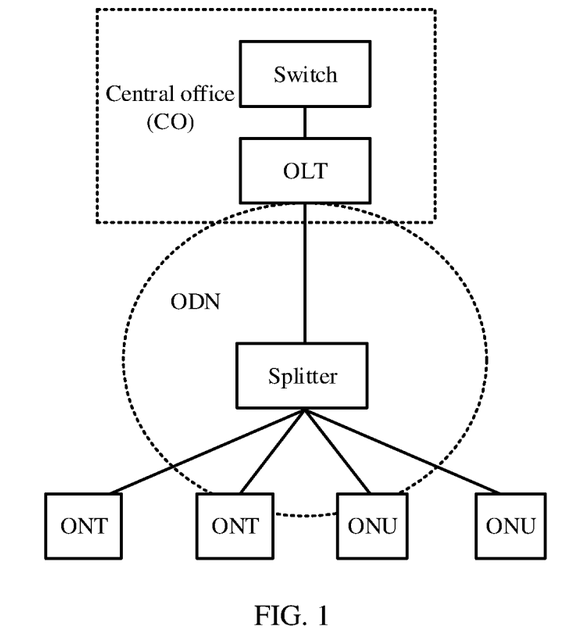
FIG. 1 is a schematic diagram of an architecture of a PON according to an embodiment of this application.

A PON is a technology for implementing the optical access network, and the PON is an optical access technology for point-to-multipoint transmission. A system architecture of a non-limiting, exemplary PON is shown in FIG. 1. In FIG. 1, an OLT is configured to provide a network-side interface for the OAN. The OLT is connected to a network-side device (for example, a switch or a router) at an upper layer, and is connected to one or more ODNs at a lower layer.

The ODN includes a passive optical splitter used for optical power allocation, a feeder fiber connected between the passive optical splitter and the OLT, and a distribution fiber connected between the passive optical splitter and an ONU. During downlink data transmission, the ODN transmits downlink data of the OLT to each ONU through the optical splitter. Similarly, during uplink data transmission, the ODN aggregates uplink data of ONUs and transmits aggregated uplink data to the OLT.

The ONU provides a user-side interface for the OAN and is connected to the ODN. If the ONU also provides a user port function, for example, the ONU provides an Ethernet user port or a plain old telephone service (POTS) user port, the ONU is referred to as an optical network termination (ONT).

As shown in FIG. 1, a conventional OLT is usually located in a central office (CO), and the CO usually further includes the network-side device. The PON shown in FIG. 1 is applicable to a scenario in which the ONU and the ONT are deployed in an area such as a city close to the central office.

Figure 2:
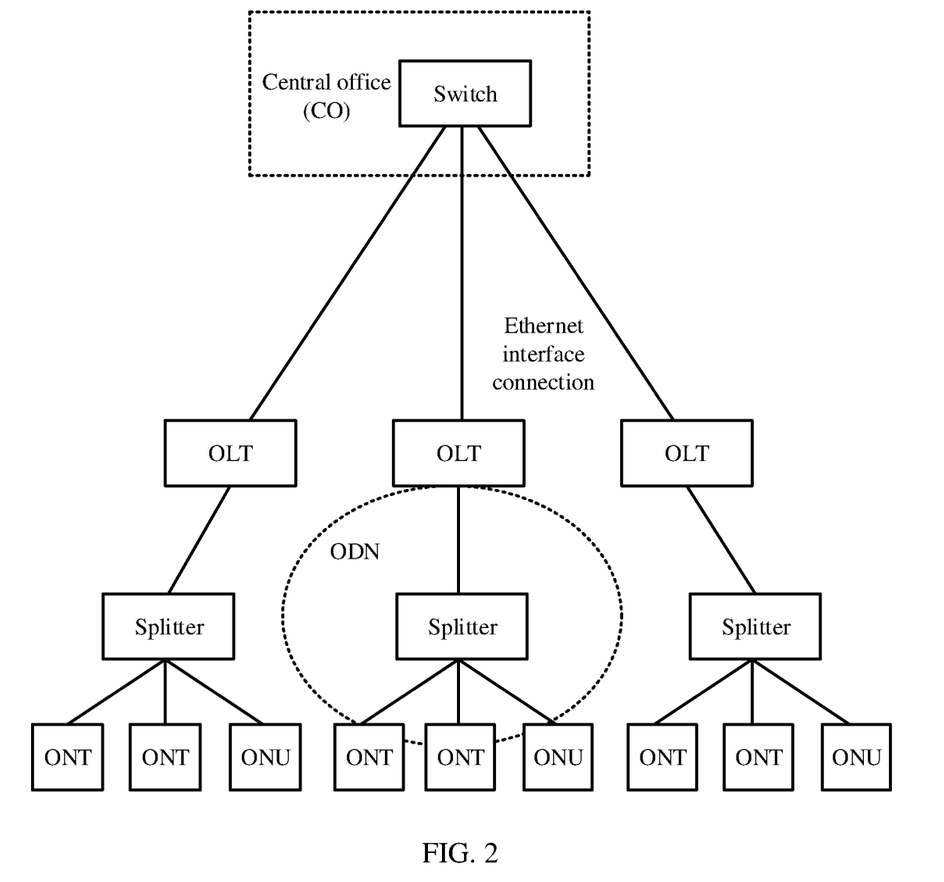
FIG. 2 is a schematic diagram of another architecture of a PON according to an embodiment of this application.

With popularization of broadband services, more ONUs and ONTs are deployed in a remote area. OLT devices need to be gradually deployed downstream from the central office to a remote area such as a village or a town. FIG. 2 is a diagram of another non-limiting exemplary structure of a PON according to an embodiment of the present disclosure. As shown in FIG. 2, an OLT device is no longer deployed in a central office, but is deployed closer to a device such as an ONT or an ONU. The PON shown in FIG. 2 may include more OLTs, so that more users in remote areas may access a broadband service.

For ease of understanding this application, several technical terms in this application are first described.

(1) PON Interface

The PON is a point-to-multipoint optical access technology. The PON interface is a port used for data connection in a communications network for which the PON is used. A transmission medium connected to the PON interface is an optical fiber, used to receive or send an optical signal.

Because there are a plurality of types of PONs, for example, an asynchronous transfer mode PON (APON), a broadband PON (broadband passive optical network, BPON), an Ethernet PON (EPON), a gigabit PON (GPON), and a 10 gigabits per second Ethernet PON (10G-EPON), there may also be a plurality of types of PON interfaces, for example, a GPON interface, an EPON interface, a symmetric 10G-GPON interface, an asymmetric 10G-GPON interface, 10G-EPON interface, a TWDM-PON interface, and another PON interface with a higher working rate that emerges in the future.

It may be understood that different PONs may use different protocols, and signal formats may be different when signals are transmitted by using different PON technologies. In embodiments of this application, different types of PON interfaces correspond to different protocols, and a signal that may be identified by and transmitted through the PON interface is a signal encapsulated by using a corresponding protocol. Therefore, if a device includes two PON interfaces of different types, protocol conversion processing needs to be performed on a signal received through one PON interface, and the signal may be sent through the other PON interface only after the signal is encapsulated by using a protocol corresponding to the other PON interface.

In embodiments of this application, a type of a PON interface identifies a type of an optical access technology used by the PON interface, and also identifies a protocol corresponding to the PON interface.

It may be understood that the PON interface performs communication in a point-to-multipoint manner. For example, as shown in FIG. 2, the OLT is connected to a user-side device through a PON interface, and may be connected to a plurality of ONTs through one PON interface. In other words, for a plurality of PON interfaces connecting the OLT to the user-side device in a downlink direction, each PON interface may correspond to a plurality of user-side devices.

(2) Ethernet

The Ethernet is a most widely applied local area network communication mode and is also a protocol. An Ethernet interface is a port used for data connection in a network structure for which the Ethernet protocol is used. The Ethernet interface may be used to receive or send a signal, such as an Ethernet frame, for which the Ethernet protocol is used.

The Ethernet interface mentioned in embodiments of this application may include a plurality of types, for example, at least one of an SC fiber interface, an RJ-45 interface, an FDDI interface, an AUI interface, a BNC interface, and a console interface. A transmission medium connected to the Ethernet interface may include a coaxial cable, a twisted pair, an optical fiber, or the like.

The Ethernet interface performs communication in a point-to-point manner. For example, as shown in FIG. 2, a switch is connected to an OLT through an Ethernet interface. When there are a plurality of OLTs, the switch needs to be connected to different OLTs through different Ethernet interfaces. In other words, in a plurality of Ethernet interfaces connecting the switch to the OLTs, each Ethernet interface corresponds to only one OLT.

Figure 3:
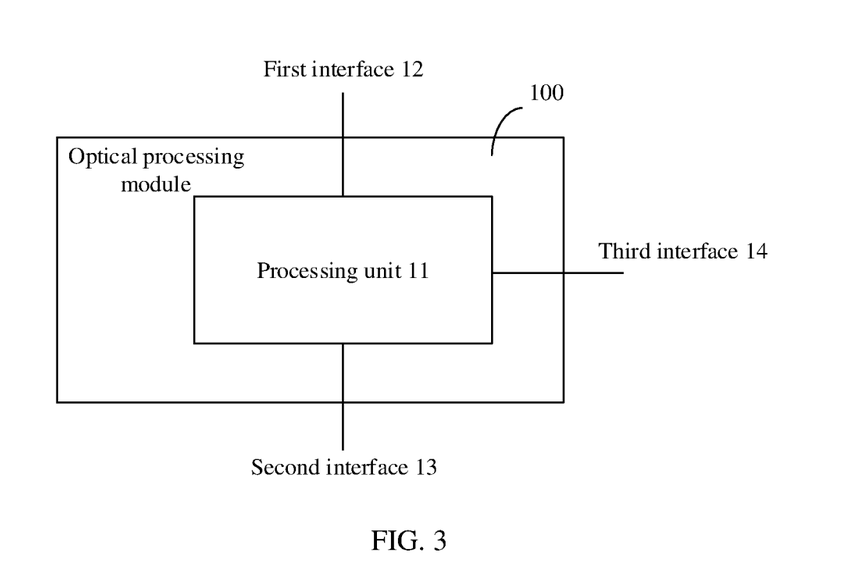
FIG. 3 is a schematic diagram of a hardware structure of an optical processing module according to an embodiment of this application.

FIG. 3 is a schematic diagram of a hardware structure of an optical processing module 100 according to an embodiment of this application. As shown in FIG. 3, the optical processing module 100 includes a processing unit 11, a first interface 12, a second interface 13, and a third interface 14.

It may be understood that FIG. 3 is merely a schematic diagram of the optical processing module. In another embodiment of this application, the optical processing module 100 may further include more first interfaces 12, second interfaces 13, and third interfaces 14. Quantities of the first interfaces 12, the second interfaces 13, and the third interfaces 14 that are included in the optical processing module 100 are not limited in embodiments of this application.

The first interface 12 is used by the optical processing module 100 to connect to and communicate with an upper-layer device (for example, a switch or a router), the second interface 13 is used by the optical processing module 100 to connect to and communicate with a user-side device (for example, an ODN or an ONU), and the third interface 14 is used to connect to and communicate with a third interface of another optical processing module.

The processing unit 11 is configured to process, according to a first control instruction, data received from at least one first interface 12 and at least one third interface 14. The first control instruction indicates an actual data bandwidth allocated to the at least one first interface 12 and an actual data bandwidth allocated to the at least one third interface 14 in a downlink direction.

A sum of the actual data bandwidth allocated to the at least one first interface 12 and the actual data bandwidth allocated to the at least one third interface 14 is not greater than (that is, less than or equal to) a processing capability of the optical processing module 100.

In this embodiment of this application, a bandwidth of an interface of the optical processing module is an amount of data that may pass through the interface per unit of time (e.g., 1 second), and is usually represented by bps (bit per second), that is, an amount of data that may be transmitted per second. For example, an actual transmission bandwidth of the first interface 12 is 5M (which is actually 5 Mbps, and bps is usually omitted). It indicates that an amount of data that may be transmitted through the first interface 12 within 1 second (s) is 5 MB.

The processing capability of the optical processing module 100 may be a size of a data packet that may be processed by the optical processing module 100 per unit of time. For example, an amount of data that may be transmitted by the optical processing module in 1 second is 100 MB, the actual data bandwidth allocated to the first interface 12 is 50 Mbps, and the actual data bandwidth allocated to the third interface 14 is 30 Mbps.

The first control instruction may be sent by a bandwidth scheduling unit in an optical processing apparatus to the optical processing module 100. The optical processing apparatus may include a plurality of optical processing modules, and the optical processing modules connect to and communicate with each other through their respective third interfaces. The bandwidth scheduling unit is configured to allocate an actual transmission bandwidth to each optical processing module in the optical processing apparatus.

The processing unit 11 is further configured to perform at least data parsing, encapsulation, and scheduling on a part or all of the data received from the first interface 12 and the third interface 14, and send processed data to the user-side device through the at least one second interface 13.

Alternatively, the processing unit 11 sends a part or all of the data received from the first interface 12 and the third interface 14 to another optical processing module through another third interface different from the interface used to receive the data.

If the optical processing module 100 has only one third interface 14, downlink data received from the first interface 12 and the third interface 14 may be sent to the user-side device only through the second interface 13.

If the optical processing module has a plurality of third interfaces 14, for the downlink data received from the first interface 12 and the third interface 14, a part of the downlink data may be sent to the user-side device through the second interface 13, and the remaining downlink data is sent to another optical processing module through another third interface 14 different from the interface used to receive the data, and then is sent to the user-side device by the another optical processing module.

For the downlink data received from the first interface 12 and the third interface 14, the processing unit 11 determines, based on an actual data bandwidth allocated to each interface and a status of each interface, whether the downlink data is sent through the second interface 13 or the third PON interface 14.

The processing unit 11 is further configured to process, according to a second control instruction, data received from the at least one second interface 13 and the at least one third interface 14. The second control instruction indicates an actual data bandwidth allocated to the at least one second interface 13 and an actual data bandwidth allocated to the at least one third interface 14 in an uplink direction.

A sum of the actual data bandwidth allocated to the at least one second interface 13 and the actual data bandwidth allocated to the at least one third interface 14 is not greater than the processing capability of the optical processing module. The second control instruction may be sent by the bandwidth scheduling unit in the optical processing apparatus to the optical processing module 100.

For example, the processing unit 11 is configured to perform at least data parsing, encapsulation, and scheduling on a part or all of the data received from the at least one second interface 13 and the at least one third interface 14, and send processed data to the upper-layer device through the at least one first interface 12.

Alternatively, the processing unit 11 sends a part or all of the data received from the at least one second interface 13 and the at least one third interface 14 to another optical processing module through another third interface different from the interface used to receive the data.

If the optical processing module 100 has only one third interface 14, uplink data received from the at least one second interface 13 and the third interface 14 may be sent to the upper-layer device only through the first interface 12.

If the optical processing module has a plurality of third interfaces 14, for the uplink data received from the at least one second interface 13 and the plurality of third interface 14, a part of the uplink data may be sent to the user-side device through the at least one first interface 12, and the remaining uplink data is sent to another optical processing module through another third interface different from the interface used to receive the data, and then is sent to the upper-layer device by the another optical processing module.

The at least one first interface 12 and the at least one third PON interface 14 are Ethernet interfaces, and the at least one second interface 13 is a PON interface. The Ethernet interface is used to implement a function of processing an Ethernet MAC-layer protocol/processing an Ethernet physical-layer protocol when communicating with the upper-layer device.

The PON interface may include at least one of the following: a GPON interface, an EPON interface, a symmetric 10G-GPON interface, an asymmetric 10G-GPON interface, a 10G-EPON interface, a TWDM-PON interface, or a PON interface with a higher working rate that emerges in the future.

Because a type of the at least one first interface 12 and the at least one third interface 14 is different from a type of the at least one second interface 13, the processing unit 11 is configured to perform protocol conversion on a received optical signal, so that a processed optical signal is applicable to a sending interface.

The following describes two exemplary conversion manners.

In a first manner, protocol conversion is directly performed on the optical signal. In an optional embodiment, during downlink data transmission, the processing unit 11 is configured to parse, by using a protocol corresponding to the at least one first interface 12, a first optical signal received from the fat least one first interface 12, and encapsulate, by using a protocol corresponding to the at least one second interface 13, a parsed first optical signal, to complete protocol conversion on the first optical signal. During uplink data transmission, the processing unit 11 is configured to parse, by using the protocol corresponding to the at least one second interface 13, a second optical signal received from the at least one second interface 13, and encapsulate, by using the protocol corresponding to the at least one first interface 12, a parsed second optical signal, to complete protocol conversion on the second optical signal.

Figure 4:
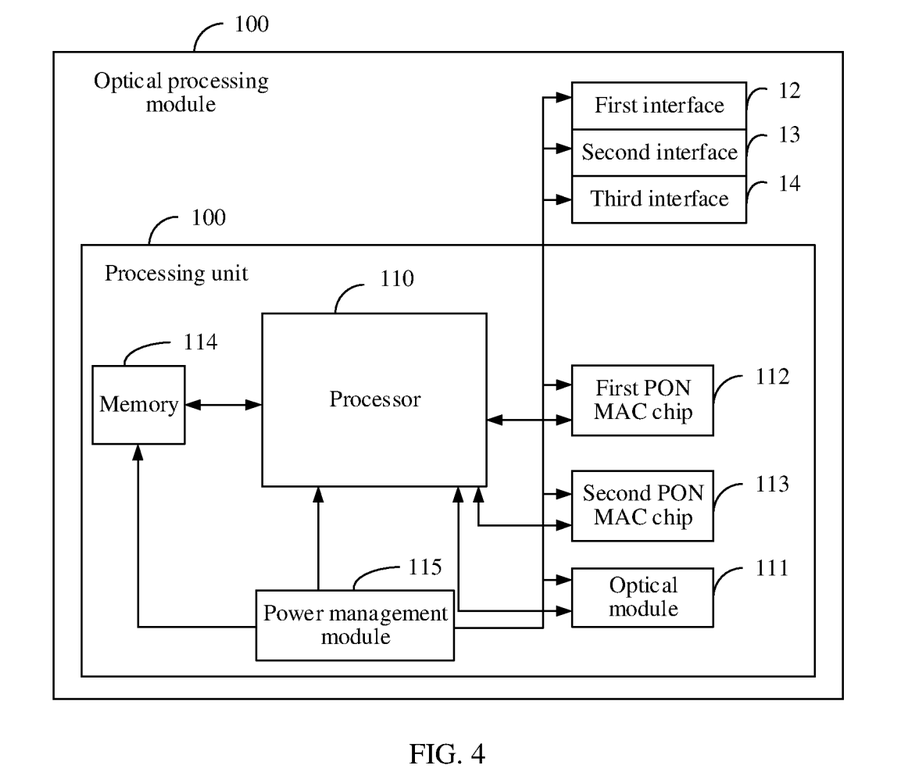
FIG. 4 is a schematic diagram of another hardware structure of an optical processing module according to an embodiment of this application.

In a second manner, after the optical signal is converted into an electrical signal, protocol conversion is performed on the electrical signal. In an optional embodiment, FIG. 4 is a schematic diagram of another hardware structure of an optical processing module according to an embodiment of this application. The processing unit 11 includes a processor 110, an optical module 111, a first PON MAC chip 112, and a second PON MAC chip 113. The first PON MAC chip 112 uses the protocol corresponding to the at least one first interface 12, and the second PON MAC chip 113 uses the protocol corresponding to the at least one second interface 13.

During data downlink transmission, the processor 110 is further configured to: indicate the optical module 111 to convert the first optical signal received from the first interface 12 into a first electrical signal; indicate the first PON MAC chip 112 to perform protocol deframing on the first electrical signal; indicate the second PON MAC chip 113 to perform protocol framing on a first electrical signal obtained through protocol deframing; and indicate the optical module 111 to perform electrical-to-optical conversion on a first electrical signal obtained through protocol framing, to obtain a processed first optical signal, so as to complete protocol conversion on the first optical signal.

During data uplink transmission, the processor 110 is further configured to: indicate the optical module 111 to convert the second optical signal received from the second interface 13 into a second electrical signal; indicate the second PON MAC chip 113 to perform protocol deframing on the second electrical signal; indicate the first PON MAC chip 112 to perform protocol framing on a second electrical signal obtained through protocol deframing; and indicate the optical module 111 to perform electrical-to-optical conversion on a second electrical signal obtained through protocol framing, to obtain a processed second optical signal, so as to complete protocol conversion on the second optical signal.

As shown in FIG. 4, the processing unit 11 further includes a memory 114. The memory 114 is coupled to the processor 110, and is configured to store various software programs and/or a plurality of sets of instructions. Specifically, the memory 114 may include a high-speed random access memory, and may also include a non-volatile memory, for example, one or more magnetic disk storage devices, flash memory devices, or other non-volatile solid-state storage devices. The memory 114 may store an operating system (which is referred to as a system below), for example, an embedded operating system such as ANDROID, iOS, WINDOWS, or LINUX. The memory 114 may further store a network communications program. The network communications program may be used to communicate with one or more optical line terminations, one or more user-side devices, or one or more network-side devices.

The processor 111 may be configured to read and execute computer-readable instructions, to complete a function of managing the optical processing module 100, and to parse, control, or process a packet received by the optical processing module 100. Specifically, the processor 111 may be configured to invoke the program stored in the memory 114, and execute instructions included in the program. The instructions may be used to implement a signal transmission function of the optical processing module 100 in a PON communications network.

The processing unit 11 further includes a power management module 115, configured to provide a stable power supply for the optical processing module 100.

Figure 5:
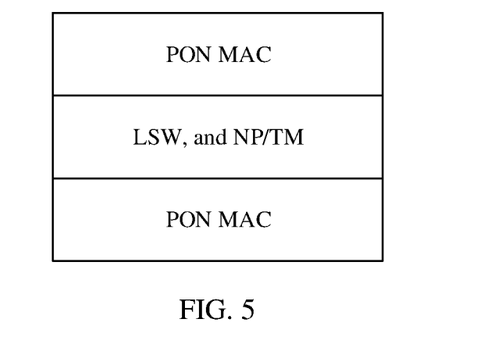
FIG. 5 is a schematic diagram of still another hardware structure of an optical processing module according to an embodiment of this application.

In this embodiment of this application, the optical processing module may be implemented by using a single SOC. FIG. 5 is a schematic diagram of still another hardware structure of an optical processing module according to an embodiment of this application. Referring to FIG. 5, from a perspective of a protocol, the SOC may include one or more PON MAC chips configured to process a communication service between the SOC and an upper-layer device. The PON MAC chip is configured to complete a function of processing a PON media access control (media access control, MAC) layer protocol. The SOC may further include a component or a chip configured to implement a forwarding function. The component or the chip may be configured to implement local area network switching (LAN switching, LSW) and forwarding, network processing (NP), traffic management (TM), or the like. The SOC further includes one or more PON MAC chips configured to process a communication service between the SOC and a lower-layer device. The PON MAC chip is configured to complete a function of processing a PON MAC layer protocol.

It may be understood that the optical processing module 100 may further include an uplink board, a backplane that provides a physical connection for each unit, a clock, a fan, a fan control unit, and the like.

It should be noted that the optical processing module 100 shown in FIG. 3 and FIG. 4 is merely an implementation of this application. During actual application, the optical processing module 100 may alternatively include more or fewer components. This is not limited in embodiments of the present disclosure.

In the foregoing embodiments, the optical processing module 100 connects to and communicates with another optical processing module through the third interface 14. A plurality of interconnected optical processing modules constitute an optical processing apparatus. The optical processing apparatus includes at least two optical processing modules shown in FIG. 3 or FIG. 4. The at least two optical processing modules connect to each other through a third interface, and the optical processing apparatus may be an OLT.

The optical processing apparatus further includes at least one bandwidth scheduling unit, configured to allocate actual data bandwidths to first interfaces and third interfaces in the plurality of optical processing modules.

Each optical processing module in the optical processing apparatus may send data to the upper-layer device or a terminal-side device through an interface of the optical processing module, or may send data to the upper-layer device or a terminal-side device through an interface of another connected optical processing module.

When two optical processing modules are disconnected, the two optical processing modules cannot communicate with each other. Each optical processing module may send data to the upper-layer device or the terminal-side device only through an interface of the optical processing module.

Figure 6:
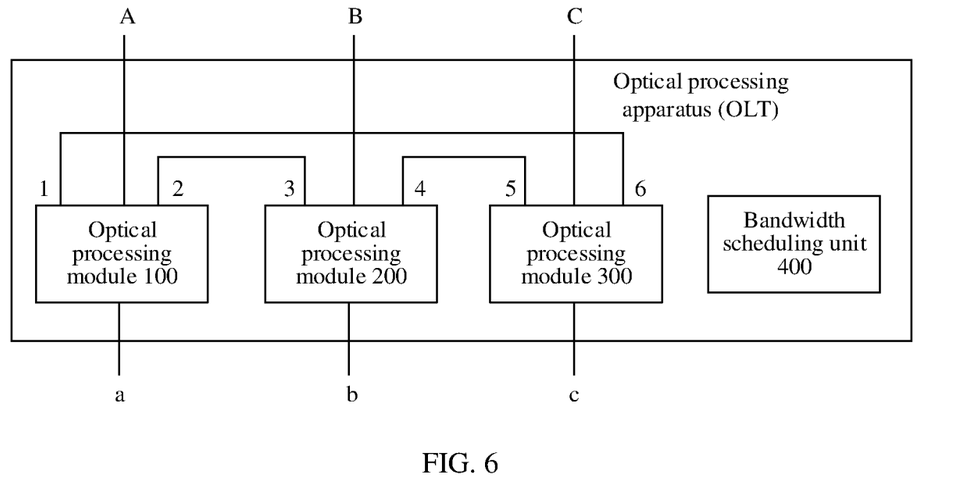
FIG. 6 is a schematic diagram of a hardware structure of an optical processing apparatus according to an embodiment of this application.

FIG. 6 is a schematic diagram of a hardware structure of an optical processing apparatus according to an embodiment of this application. As shown in FIG. 6, the optical processing apparatus includes three optical processing modules: an optical processing module 100, an optical processing module 200, and an optical processing module 300, and a bandwidth scheduling unit 400. The optical processing module 100, the optical processing module 200, and the optical processing module 300 each includes one first interface, one second interface, and two third interfaces.

The optical processing module 100, the optical processing module 200, and the optical processing module 300 connect to each other through the third interface, to form a full mesh. Any two optical processing modules connect to each other through an independent third interface.

As shown in FIG. 6, a third interface 1 of the optical processing module 100 connects to a third interface 6 of the optical processing module 300, a third interface 2 of the optical processing module 100 connects to a third interface 3 of the optical processing module 200, and a third interface 4 of the optical processing module 200 connects to a third interface 5 of the optical processing module 300. The optical processing module 100 further includes a first interface A and a second interface a, the optical processing module 200 further includes a first interface B and a second interface b, and the optical processing module 300 further includes a first interface C and a second interface c.

In this embodiment, each optical processing module may communicate with the other two optical processing modules through the third interface. The bandwidth scheduling unit 400 controls communication between a plurality of optical processing modules. The bandwidth control unit 400 may be an independent CPU, or may reuse a processing unit in an optical processing module.

The bandwidth scheduling unit 400 may allocate actual data bandwidths to first interfaces and third interfaces in the plurality of optical processing modules included in the optical processing apparatus.

The bandwidth scheduling unit 400 may determine, based on an interconnection bandwidth of each first interface, oversubscription ratios allowed by different service types, statistics of chip and port traffic (which may be statistics at microsecond (μs) level to second level), and the like, the actual data bandwidth allocated to the third interfaces in the plurality of optical processing modules.

The bandwidth scheduling unit 400 further allocates an actual data bandwidth to the first interface of each optical processing module based on a processing capacity of the optical processing module and an actual data bandwidth allocated to the third interface.

Optionally, the bandwidth scheduling unit 400 may alternatively allocate actual data bandwidths to the first interface and the third interface in each optical processing module based on a load status of the optical processing module. For example, when a current load of the optical processing module 100 is relatively low, the bandwidth scheduling unit 400 allocates more bandwidths to the first interface and the third interface of the optical processing module 100. When a current load of the optical processing module 200 is relatively high, the bandwidth scheduling unit 400 reduces bandwidths of the first interface and the third interface of the optical processing module 200.

The bandwidth scheduling unit 400 allocates the actual data bandwidths to the first interface and the third interface in each optical processing module based on the load status of the optical processing module, so that the optical processing apparatus achieves optimal performance.

In this embodiment, the bandwidth scheduling unit 400 may collect statistics at microsecond (μs) level to second level on traffic of each interface, to perform traffic control at microsecond (μs) level to second level on the interface.

The optical processing module 100 is used as an example. It is assumed that the processing capability of the optical processing module 100 is that a size of a data packet that may be processed in 1 second is 200 MB, an actual data bandwidth allocated to the first interface A is 100 Mbps, an actual data bandwidth allocated to the third interface 1 is 30 Mbps, and an actual data bandwidth allocated to the third interface 2 is 50 Mbps. When a data packet of 80 MB is received from the first interface A, 50 MB of the data packet may be sent to a user-side device through the second interface a, and the remaining 30 MB of the data packet may be sent to the user-side device through the third interface 1 and/or the third interface 2.

In an example implementation, the optical processing module 100 may have a plurality of actual forms. In an optional embodiment, the optical processing module 100 may be implemented in a form of a box-shaped device or an integrated device.

Figure 7:
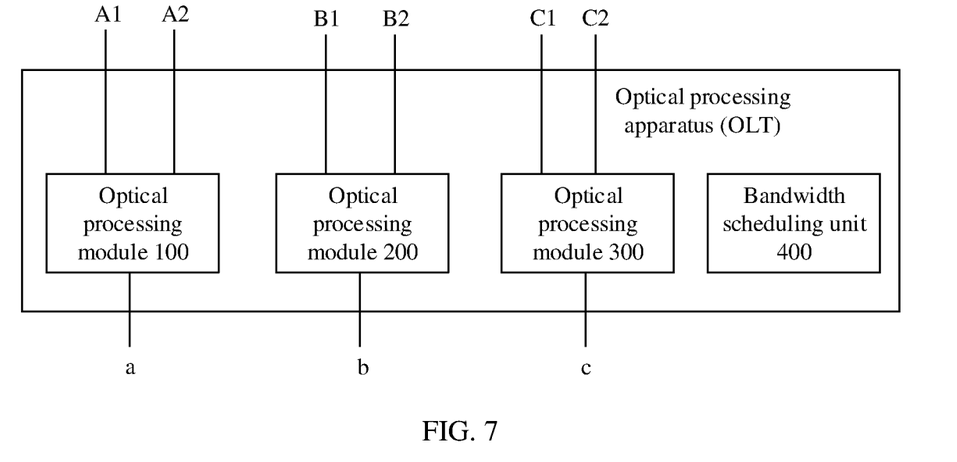
FIG. 7 is a schematic diagram of another hardware structure of an optical processing apparatus according to an embodiment of this application.

FIG. 7 is a schematic diagram of another hardware structure of an optical processing apparatus according to an embodiment of this application. As shown in FIG. 7, in comparison with the optical processing apparatus shown in FIG. 6, in the optical processing apparatus in this embodiment, a third interface of each optical processing module is disconnected, and optical processing modules do not connect to each other.

Optionally, each optical processing module includes two first interfaces, and the two first PON interfaces may be active/standby interfaces.

As shown in FIG. 7, an optical processing module 100 includes two first interfaces A1 and A2, and the optical processing module 100 includes one second interface a. An optical processing module 200 includes two first interfaces B1 and B2, and the optical processing module 200 includes one second interface b. An optical processing module 300 includes two first interfaces C1 and C2, and the optical processing module 300 includes one second interface c.

In this embodiment, an actual data bandwidth of the first interface of each optical processing module is allocated by a bandwidth scheduling unit.

In some embodiments of this application, the optical processing apparatus shown in FIG. 6 and FIG. 7 may be implemented in a form of a box-shaped device or an integrated device. The optical processing apparatus may be an OLT, and each optical processing module in the OLT may be implemented by using one SOC. In comparison with an optical processing module with a single SOC, an optical processing apparatus obtained by connecting and extending a plurality of SOCs may provide more ports. When a high-density box-shaped device or a medium-density box-shaped device is formed, this solution is simple and cost-effective.

What is claimed is:

1. An optical processor, comprising at least one processor, at least one first interface, at least one second interface, and at least one third interface, wherein
    each of the at least one first interface is configured to connect to and communicate with an upper-layer device, each of the at least one second interface is configured to connect to and communicate with a user-side device, and each of the at least one third interface is configured to connect to and communicate with a third interface of another optical processor; and
    the at least one processor is configured to process, according to a first control instruction, data received from the at least one first interface and the at least one third interface, wherein the first control instruction indicates an actual data bandwidth allocated to the at least one first interface and an actual data bandwidth allocated to the at least one third interface in a downlink direction, and a sum of the actual data bandwidth allocated to the at least one first interface and the actual data bandwidth allocated to the at least one third interface is not greater than a processing capability of the optical processor.

2. The optical processor according to claim 1, wherein the at least one processor is further configured to perform at least data parsing, encapsulation, and scheduling on a part or all of the data received from the at least one first interface and the at least one third interface, and send processed data to the user-side device through the at least one second interface.

3. The optical processor according to claim 1, wherein the at least one processor is further configured to send a part or all of the data received from the at least one first interface and the at least one third interface to another optical processor through another third interface different from the interface used to receive the data.

4. The optical processor according to claim 1, wherein the at least one first interface and the at least one third interface are Ethernet interfaces, and the at least one second interface is a passive optical network (PON) interface.

5. The optical processor according to claim 1, wherein the at least one processor is further configured to process, according to a second control instruction, data received from the at least one second interface and the at least one third interface, wherein the second control instruction indicates an actual data bandwidth allocated to the at least one second interface and the actual data bandwidth allocated to the at least one third interface in an uplink direction, and a sum of the actual data bandwidth allocated to the at least one second interface and the actual data bandwidth allocated to the at least one third interface is not greater than the processing capability of the optical processor.

6. The optical processor according to claim 5, wherein the at least one processor is further configured to perform at least data parsing, encapsulation, and scheduling on a part or all of the data received from the at least one second interface and the at least one third interface, and send processed data to the upper-layer device through the at least one first interface.

7. The optical processor according to claim 5, wherein the at least one processor is further configured to send a part or all of the data received from the at least one second interface and the at least one third interface to another optical processor through another third interface different from the interface used to receive the data.

8. An optical processing apparatus, comprising:
    a plurality of optical processors each according to claim 1, wherein at least two optical processors in the plurality of optical processors are connected through their respective third interfaces; and
    at least one bandwidth scheduler, configured to allocate actual data bandwidths to first interfaces and third interfaces in the plurality of optical processors.

9. The optical processing apparatus according to claim 8, wherein at least two optical processors in the plurality of optical processors are disconnected.

10. The optical processing apparatus according to claim 8, wherein each optical processor comprises two first interfaces, and the two first interfaces are active/standby interfaces.

11. The optical processor according to claim 1, wherein the processing capability of the optical processor is a size of a data packet that can be processed by the optical processor per unit of time.

12. The optical processor according to claim 1, wherein the at least one first interface comprises two first interfaces that are active/standby interfaces.

13. A data processing method, performed by an optical processor including at least one processor, at least one first interface, at least one second interface and at least one third interface, comprising:
processing, according to a first control instruction, data received from the at least one first interface and the at least one third interface, wherein each of the at least one first interface is configured to connect to and communicate with an upper-layer device, and each of the at least one third interface is configured to connect to and communicate with a third interface of another optical processor,
wherein the first control instruction indicates an actual data bandwidth allocated to the at least one first interface and an actual data bandwidth allocated to the at least one third interface in a downlink direction, and a sum of the actual data bandwidth allocated to the at least one first interface and the actual data bandwidth allocated to the at least one third interface is not greater than a processing capability of the optical processor.

14. The data processing method according to claim 13, wherein the processing of data according to the first control instruction comprises:
parsing, encapsulation, and scheduling a part or all of the data received from the at least one first interface and the at least one third interface, and sending processed data to a user-side device through the at least one second interface, wherein each of the at least one second interface is configured to connect to and communicate with one user-side device.

15. The data processing method according to claim 13, further comprising:
sending a part or all of the data received from the at least one first interface and the at least one third interface to another optical processor through another third interface different from the interface used to receive the data.

16. The data processing method according to claim 13, further comprising:
processing, according to a second control instruction, data received from at least one second interface and the at least one third interface, wherein the second control instruction indicates an actual data bandwidth allocated to the at least one second interface and the actual data bandwidth allocated to the at least one third interface in an uplink direction, and a sum of the actual data bandwidth allocated to the at least one second interface and the actual data bandwidth allocated to the at least one third interface is not greater than the processing capability of the optical processor, wherein each of the at least one second interface is configured to connect to and communicate with one user-side device.

17. The data processing method according to claim 16, wherein the processing of data according to the second control instruction comprises:
parsing, encapsulation, and scheduling a part or all of the data received from the at least one second interface and the at least one third interface, and sending processed data to the upper-layer device through the at least one first interface.

* * * * *

UNITED STATES PATENT AND TRADEMARK OFFICE
CERTIFICATE OF CORRECTION

PATENT NO. : 11,575,441 B2
APPLICATION NO. : 17/371168
DATED : February 7, 2023
INVENTOR(S) : Liankui Lin It is certified that error appears in the above-identified patent and that said Letters Patent is hereby corrected as shown below:

In the Specification

- Column 1, Line 21, change "(FITC)" to --(FTTC)--;

- Column 7, Line 57, change "fat" to --at--.

Signed and Sealed this
Seventh Day of March, 2023

Katherine Kelly Vidal
*Director of the United States Patent and Trademark Office*